Feb. 5, 1924.

A. HOFFBAUER

INSECT TRAP

Filed May 9, 1923

1,482,992

WITNESSES
Edw. Thorpe.
Robert D Hulsizer.

INVENTOR
August Hoffbauer
BY
ATTORNEYS

Patented Feb. 5, 1924.

1,482,992

UNITED STATES PATENT OFFICE.

AUGUST HOFFBAUER, OF BROOKLYN, NEW YORK.

INSECT TRAP.

Application filed May 9, 1923. Serial No. 637,745.

*To all whom it may concern:*

Be it known that I, AUGUST HOFFBAUER, a citizen of Germany, and a resident of the city of New York, borough of Brooklyn, in the county of Kings and State of New York, have invented a new and Improved Insect Trap, of which the following is a full, clear, and exact description.

This invention relates to an insect trap, and has for an object the provision of means whereby a trap containing an insecticide is impregnated with material which has an odor attractive to insects, this impregnation preventing the insecticide itself from being taken up by the pores of the trap, whereby it can remain in the trap.

Another object is to provide a trap so treated that a minimum evaporation of the insecticide contained therein will take place.

A further object concerns the provision of means whereby the trap is extremely simple in its construction and, therefore, can be manufactured very economically, the simplicity of construction permitting the trap to be handled and operated with ease.

The invention is illustrated in the drawings, of which—

Figure 1:
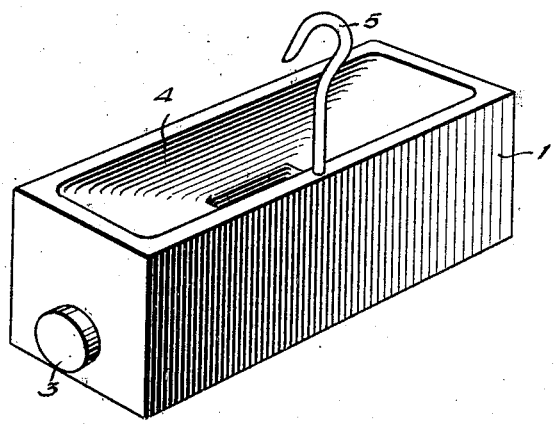
Figure 1 is a perspective view of the trap.
Figure 2:
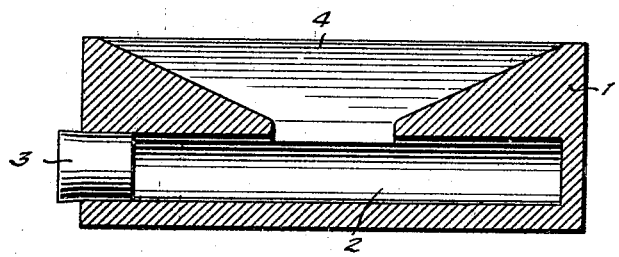
Figure 2 is a longitudinal section therethrough.

The form of the invention shown in the drawings is a preferred form, although it is understood that modifications in the construction and arrangement of the parts and in the character of the materials used may be adopted without departing from the spirit of the invention.

The preferred form of the invention shown in the drawings includes a block of porous material 1, preferably of wood, provided with a bore 2 extending thereinto from one edge, said bore forming a chamber into which the insecticide may be poured. The open end of this chamber can be closed by a stopper 3. The upper surface of the block is cut to form a shallow depression 4 therein. This depression, especially at its center, being deep enough to open into the bore 2 so that the material forming the insecticide will be accessible from the top of the trap through this opening.

Insecticide of any suitable kind can be placed within the block. This insecticide may be either liquid or powder. Prior to being filled with insecticide, the material of the trap, preferably wood, is impregnated with any suitable material acting to prevent sweating of the wood and to prevent the assimilation of the insecticide in the pores of the wood. This material is preferably an oily material; any one can be chosen, but preferably one which has an odor of proper character to attract insects. In this way the impregnation of the pores of the wood by the insect-attracting liquid acts not only as a bait but also as a means for preventing the too rapid evaporation of the insecticide when said insecticide is a liquid.

This trap may be disposed on the ground or attached to any point, such as a limb or twig of a tree or bush, by means of a hook 5 which can be screwed into the block at any suitable point.

It will be apparent that this trap is simplicity itself and can be made extremely economically. It is capable of being very readily disposed in any desired position; the material within it is very effectively prevented from evaporating rapidly; and the body portion of the trap itself acts as a very strong bait to the insect which it is desired to catch or destroy.

What I claim is:—

An insect trap which includes a block of wood impregnated with an oily waterproof material to act as a bait for insects, said block having a chamber containing insecticide, the upper surface of the block having a shallow depression therein opening into said chamber.

AUGUST HOFFBAUER.